UNITED STATES PATENT OFFICE.

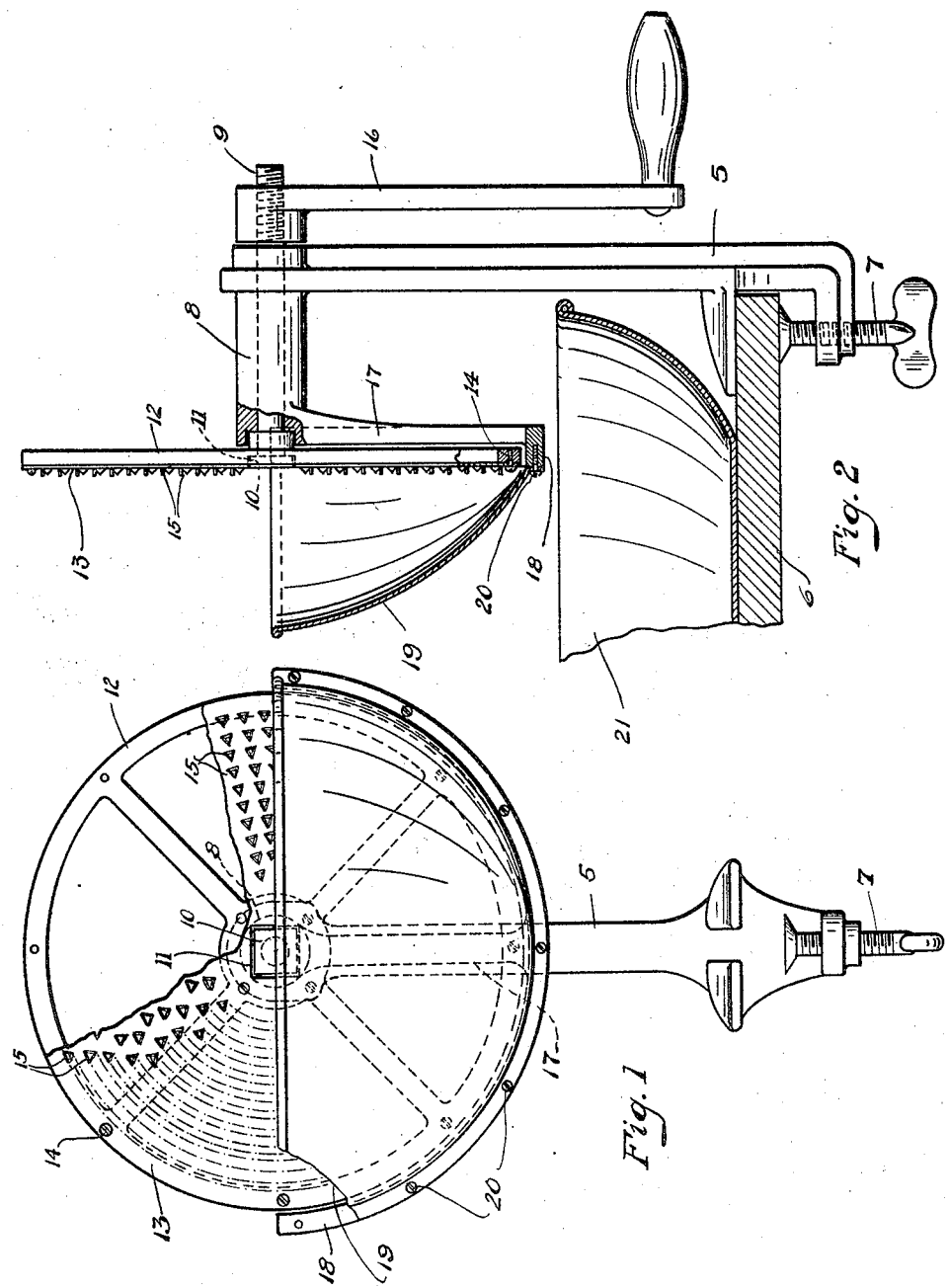

KARL L. BONIN, OF CHICAGO, ILLINOIS.

GRATER.

1,420,017.   Specification of Letters Patent.   Patented June 20, 1922.

Application filed February 10, 1922. Serial No. 535,514.

*To all whom it may concern:*

Be it known that I, KARL L. BONIN, a citizen of the United States, and a resident of the city of Chicago, county of Cook, and State of Illinois, have invented certain new and useful Improvements in Graters, of which the following is a specification.

My invention relates to graters, and has for its principal object the provision of an improved construction of this character which will be highly efficient in use.

Other objects will appear hereinafter.

The invention consists in the combinations and arrangements of parts hereinafter described and claimed.

The invention will be best understood by reference to the accompanying drawings forming a part of this specification, and in which, Fig. 1 is a front elevational view of a grater embodying the invention, Fig. 2 is a side elevational view of the same, partly in section.

The preferred form of construction, as illustrated in the drawing, comprises a bracket 5 adapted to clampingly engage the edge of a table top 6 or the like, said bracket being held in position through the medium of a hand screw 7. Carried by the bracket 5, adjacent the upper end thereof, is a laterally extending bearing 8 through which a shaft 9 is journalled. The inner end of the shaft 9 is provided with a square head 10 arranged to engage a recess 11 of a similar shape formed in a supporting disc 12. The disc 12 carries a removable plate 13 secured thereto by means of screw bolts 14. Formed on the disc 13 and extending outwardly therefrom, is a number of grating elements, said grating elements being formed on said disc by punching the same therefrom. The opposite end of the shaft 9 is screw-threaded to receive an operating handle 16 through the medium of which the device is manipulated.

Extending downwardly from the bearing 8 and formed integral therewith, is a supporting arm 17 having curved fingers 18 which extend laterally from each side of the supporting arm 16 adjacent the lower end thereof and to which the bowl or receiving receptacle 19 is removably carried, said receiving receptacle being secured to the lateral fingers 18 by means of screw bolts 20. In use the food product to be grated is fed into the receptacle 19 and by manipulating the shaft 9 through the medium of the handle 16, the grating elements carried on the plate 13 are brought into engagement with the food product and shaves the adjacent surface in to fine particles which pass through the plate 13 and thence into a bowl 21 positioned under the receptacle 19 so as to receive the grated particles as they are discharged through the plate 13.

My improved grater is especially adapted for grating food products of every description, such as cabbage, potatoes, chocolate, and the like, and can be manufactured at a small cost.

While I have illustrated and described the preferred form of construction for carrying my invention into effect, this is capable of variation and modification without departing from the spirit of the invention, I therefore, do not wish to be limited to the precise details of construction set forth, but desire to avail myself of such variations and modifications as come within the scope of the appended claims.

Having described my invention, what I claim as new and desire to secure by Letters Patent is:

1. A grater including a bracket adapted to clampingly engage the top edge of a table top or the like, a bearing carried by said bracket, a shaft journalled in said bearing, there being a rectangularly shaped head on one end of said shaft; a disc carried by said shaft, there being a rectangularly shaped recess formed in said disc for the reception of said head, grating elements carried by said shaft, and a receptacle carried by said bearing for the reception of matter to be grated, substantially as described.

2. A grater including a bracket, a bearing carried by said bracket, a shaft journalled in said bearing, grating means carried by said shaft, a depending arm carried by said bearing, lateral fingers carried by said depending arm, and a receptacle removably secured to said lateral fingers, substantially as described.

3. In a grater, the combination with a bracket adapted to clampingly engage the edge of a table top or the like, of a shaft carried by said bracket; a disc carried by said shaft; a plate removably carried by said disc, there being grating elements formed on said plate, a depending support carried by said bearing, there being lateral fingers on said support; and a receptacle carried by said fingers for the reception of matter to be grated, substantially as described.

4. A grater comprising a bracket having a bifurcated end adapted to clampingly engage the edge of a table top; a lateral bearing formed adjacent one end of said bracket; a shaft journalled in said bearing, there being a rectangularly shaped head formed on one end of said shaft; a disc carried by said shaft, there being a rectangularly shaped recess formed in said disc for the reception of said head; an operating handle carried by said shaft; a plate removably carried by said disc, there being grating elements formed on said plate; a depending arm carried by said bearing, there being lateral curved fingers adjacent the lower end of said arm; and a receptacle carried by said fingers for the reception of matter to be grated.

In testimony whereof I have signed my name to this specification in the presence of two subscribing witnesses.

KARL L. BONIN.

Witnesses:
  FREDA C. APPLETON,
  ELSIE C. GEHRKE.